United States Patent [19]

Guzzetta et al.

[11] Patent Number: 4,964,759
[45] Date of Patent: Oct. 23, 1990

[54] APPARATUS FOR SELECTIVELY ROTATING A TOOL RELATIVE TO THE WALL OF A CONDUIT

[75] Inventors: Gerald J. Guzzetta, 11137 North Rd., Perrysburg, N.Y. 14129; David E. Hornberger, Angola, N.Y.; Charles A. Guzzetta, Brant, N.Y.; Larry M. Schadt, East Amherst, N.Y.

[73] Assignee: Gerald J. Guzzetta, Perrysburg, N.Y.

[21] Appl. No.: 333,322

[22] PCT Filed: Jun. 2, 1987

[86] PCT No.: PCT/US87/01287
§ 371 Date: Jan. 30, 1989
§ 102(e) Date: Jan. 30, 1989

[87] PCT Pub. No.: WO88/09705
PCT Pub. Date: Dec. 15, 1988

[51] Int. Cl.⁵ .......................... F16L 1/00; B23B 41/00
[52] U.S. Cl. ........................ 405/154; 175/77; 166/55.7; 405/303
[58] Field of Search .............. 405/154, 156; 175/45, 175/219, 26, 99, 77, 78; 166/55.7, 55.8, 297; 138/97

[56] References Cited

U.S. PATENT DOCUMENTS

| | | | |
|---|---|---|---|
| 3,175,392 | 3/1965 | Tharalson et al. | 175/78 X |
| 3,301,337 | 1/1967 | Vaughn et al. | 175/77 X |
| 4,197,908 | 4/1980 | Davis et al. | 175/77 X |
| 4,442,891 | 4/1984 | Wood | 166/55.8 X |
| 4,648,454 | 3/1987 | Yarnell | 166/55.7 X |
| 4,768,899 | 9/1988 | Dysarz | 405/195 |

*Primary Examiner*—Dennis L. Taylor
*Attorney, Agent, or Firm*—Sommer, Oliverio & Sommer

[57] ABSTRACT

An improved device (10) is arranged to drill one or more holes through the wall of a subterranean sewer (11). The device includes a frame (13) adapted to be positioned within the sewer and moved to a desired location relative thereto. Three plate-like members (40) are mounted on the frame for movement inwardly and outwardly in a radial direction. An actuator (56) is mounted to the frame, and is selectively operable to move the plate-like members radially outwardly. Each plate-like member carries a motor (18) and a chuck (16) grasping a drill (19). When the motors are energized, the drills rotate. When the actuator is energized, the drills move radially outwardly to bore holes through the conduit wall. The apparatus is used prior to application of grout or sealant in the repair of ground water leaks.

7 Claims, 3 Drawing Sheets

APPARATUS FOR SELECTIVELY ROTATING A TOOL RELATIVE TO THE WALL OF A CONDUIT

TECHNICAL FIELD

The present invention relates generally to the field of apparatus for selectively rotating a tool relative to the wall of a conduit, and, more particularly, to an improved device for selectively drilling one or more holes through the wall of an underground storm sewer prior to a grout- or sealant-applying operation.

BACKGROUND ART

Sewers are pipes or conduits used to convey or direct various liquids, with or without entrained or suspended solids, from one point to another. There are generally two types of sewers: sanitary sewers and storm sewers. Sanitary sewers are used to convey sewage, waste water, and the like from a source (such as a house) to a suitable treatment facility. Storm sewers, on the other hand, are generally used to convey drainage or run-off water. In either case, it is generally desired to minimize the leakage of ground water into the sewer, be it of the sanitary- or storm-type. In the case of sanitary sewers, any such ground water leakage increases the volume of fluid that must be treated. In the case of storm sewers, such ground water leakage unnecessarily increases the volume of liquid carried by the sewer, and may exceed disposable or dispersal capabilities. Thus, it is generally desired to minimize the amount of ground water entering the sewer.

Sewers develop leaks for various reasons. Whatever the cause, such leaks permit ground water to enter the sewer. The ground water is generally pressurized positively relative to the pressure within the sewer, such that the ground water will flow naturally through any leakage path into the sewer.

The problem of repairing or sealing such leaks in sewers is complicated by the fact that such sewers are typically subterranean, and may be buried as deep as thirty feet beneath the surface. One technique, of course, is to dig up the entire sewer to expose the damaged portion. Another technique is to apply a grout or sealant from within the sewer to repair the damaged portion. However, such grout or sealant is typically applied to the inside of the sewer. Thus, its integrity is determined by the extent to which the grout or sealant adheres to the wall of the sewer. Many sewers are formed of a suitable plastic material, which further complicates the problem of adhering the grout or sealant thereto. Thus, there has long been a need to provide a device to allow the grout or sealant to pass through the sewer so as to bond to the outside thereof.

Additional details as to prior art sewer repair devices are shown in the following U.S. Pat. Nos. 3,834,422 (Larson), 3,915,197 (Piccirilli), 3,951,173 (Larson), 4,170,248 (Bennet et al.), 4,244,895 (Nakashin), 4,296,932 (Grobler), 4,529,008 (Appleton), 4,572,228 (Larson et al.), and 4,627,471 (Parkes et al.).

DISCLOSURE OF THE INVENTION

The present invention provides an improved device for selectively drilling one or more holes through the wall of a conduit, such as a sewer, prior to the application of grout or sealant. By providing such holes with the improved apparatus, the subsequently-applied grout or sealant may pass through the wall of the conduit and bond to the outside thereof, so as to provide a long-lasting seal of high integrity.

The improved device broadly includes: a frame adapted to be positioned within a conduit and translated (i.e., pulled, pushed, or self-propelled) to a particular desired location therealong; a chuck rotatably mounted on the frame; a motor operatively arranged to selectively rotate the chuck at a desired rotational speed (i.e. either fixed or variable); a suitable tool (e.g., a drill) releasably held in the chuck; and an actuator mechanism acting between the frame and chuck and selectively operable to cause the tool to move away from the frame to engage the wall of the conduit.

Accordingly, the general object of the present invention is to provide an improved device for rotating a tool relative to the wall of a conduit.

Another object is to provide an improved device for drilling a plurality (i.e., one or more) holes through the wall of a subterranean sewer, prior to application of grout or sealant.

Still another object is to provide an improved device for enhancing the durability and life of grout- and sealant-type repairs to subterranean sewers.

These and other objects and advantages will become apparent from the foregoing and ongoing written specification, the drawings, and the appended claims.

MODE(S) OF CARRYING OUT THE INVENTION

Figure 1:
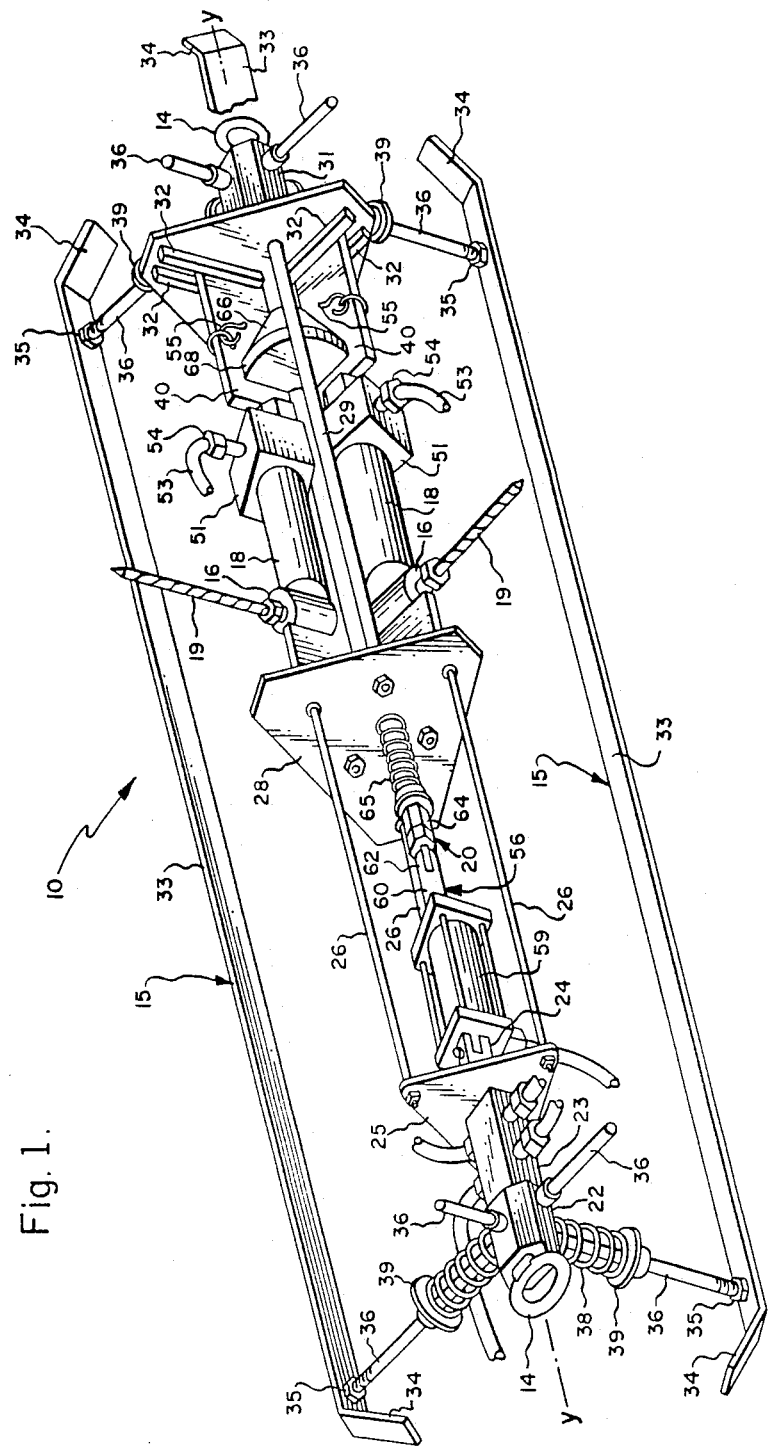
FIG. 1 is a perspective view of the improved apparatus, with one of the guides and the various hoses removed for clarity.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification and are to be considered a portion of the entire "written description" of this invention, as required by 35 U.S.C. §112. As used in the following description, the terms "horizontal", "vertical", "left", "right", "up", and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" refer to the orientation of a surface relative to its axis of elongation, or axis of rotation, as appropriate.

Referring now to the drawings, this invention provides improved apparatus for selectively rotating a suitable tool, such as a drill, relative to the wall of a conduit. As used herein, the word "conduit" is intended to refer generically to many different types of elongated conduits, tubes and pipes, which are typically used to direct and convey fluids from one point to another. Such conduits may be cylindrical, or may have other non-annular cross-sectional shapes as well. Such conduits may be formed of steel, plastic, concrete, ceramic or vitrified material, or the like. However, the invention is deemed to have particular utility in repairing leaks in underground sewer pipes and/or drains. Thus, while the preferred species will be described with reference to this particular environment, persons skilled in this art will readily appreciate that the invention is not limited to this particular application unless an express limitation to this effect appears in the appended claims.

The preferred form of the improved apparatus, generally indicated at 10, is adapted to be positioned within a conduit 11 and translated to a desired location therealong. The conduit is shown as being a subterranean plastic cylindrical pipe having an inwardly-facing cylindrical surface 12 generated about a horizontal axis x—x.

The improved apparatus broadly includes: an elongated frame 13 having an axis y—y (FIG. 1) and terminating at an eye 14 at either end; three circumferentially-spaced longitudinally-extending skids or guides, severally indicated at 15, mounted on the frame and biased to move radially outwardly therefrom to slidably engage conduit inner surface 12; three circumferentially-spaced rotatable chucks, severally indicated at 16, mounted on the frame for movement inwardly and outwardly in a radial direction; a motor 18 operatively arranged to rotate an associated chuck at a desired rotational speed (i.e., either fixed or variable); a suitable tool, such as a drill 19, releasably held in the jaws (not shown) of each chuck; and an actuator mechanism, generally indicated at 20, mounted on the frame and selectively operable to cause the three chucks to move radially outwardly so as to drill holes in, and preferably through, the conduit.

Figure 2:
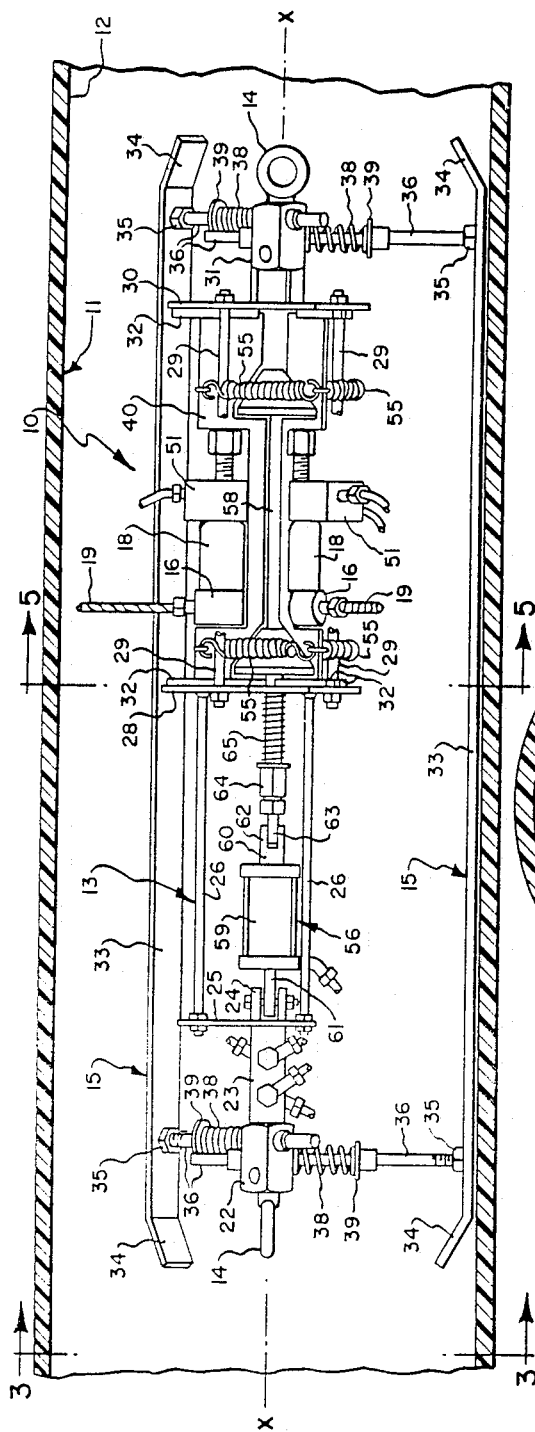
FIG. 2 is a fragmentary longitudinal vertical sectional view thereof of the improved apparatus in a conduit, and showing the drills as being in their radially-retracted positions.
Figure 3:
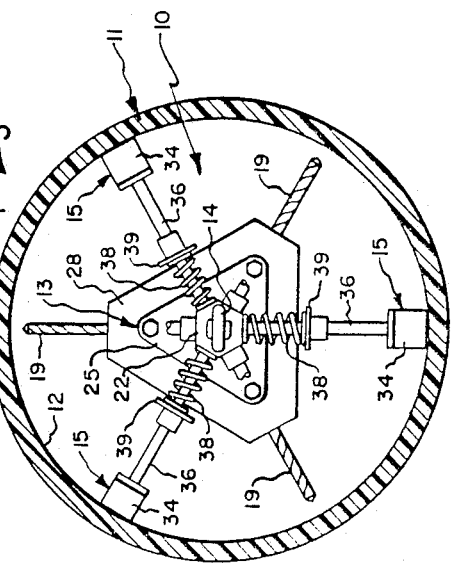
FIG. 3 is a fragmentary transverse vertical sectional view thereof, taken generally on line 3—3 of FIG. 2.

As best shown in FIGS. 1 and 2, the frame 13 is a substantially-rigid assembly of a number of component parts, all suitably joined together. More particularly, frame 13 sequentially includes (from left to right): the left eye 14; a left slide block 22; a manifold block 23 providing a manifold for a number of pneumatic connections and terminating in a rightwardmost clevis portion 24; a transversely-extending substantially-triangular left vertical plate 25 penetrated centrally by manifold block 23; three circularly-spaced longitudinally-extending rods, severally indicated at 26, extending rightwardly from marginal portions of plate 25 proximate the apices thereof: a transversely-extending substantially-triangular intermediate vertical plate 28 suitably secured to the right marginal end portions of rods 26; three circularly-spaced longitudinally-spaced rods, severally indicated at 29, extending rightwardly from locations thereof intermediate rods 26; a transversely-extending substantially-triangular right vertical plate 30 mounted on the right marginal end portions of rods 29; and a right slide block 31 extending axially rightwardly therefrom and terminating in rightwardmost eye 14. Slide blocks 22 and 31 are severally shown as being provided with three axially- and angularly-spaced diametrical through-holes, to accommodate sliding passage of the rods on which the guides 15 are mounted, all for a purpose hereinafter explained. Each of the foregoing frame elements is connected to its indicated immediate neighbor by suitable means, as more fully shown in the accompanying drawings. Thus, this assembly forms a substantially rigid frame structure 13 having a longitudinal axis y—y. Rods 26,26,26 and rods 29,29,29 form two axially-spaced cage-like enclosures for other structure, described infra. The facing surfaces of intermediate and right triangular plates 28,29 are severally provided with three aligned pairs of circularly-spaced parallel bosses or lugs, severally indicated at 32, which function to guide radial movement, both inwardly and outwardly, of the structure on which the chucks and motors are mounted, as described infra.

Each guide 15 is shown as including a longitudinally-extending skid-like member 33 provided with an in-turned portion 34 at either end. A nut 35 is suitably secured, as by welding or the like, to the inwardly-facing surface of each skid at each of two axially-spaced locations therealong. Each nut matingly receives the threaded marginal end portion of a radially-extending rod, severally indicated at 36, which is slidably arranged in one of three diametrical through-holes provided in blocks 22 and 31. A coil spring 38 is arranged to act between the associated block and an annular collar 39 secured fast to each rod between the associated block and the skid. Springs 38 are nominally the same, both as to spring rate and length, and function to bias the associated skid 33 to move radially outwardly into continuous engagement with conduit inner surface 12. At the same time, these springs, which are located at angles 120° apart, function to urge the two blocks, and hence the frame, to move to a centered concentric position with respect to conduit axis x—x.

Figures 4, 5:
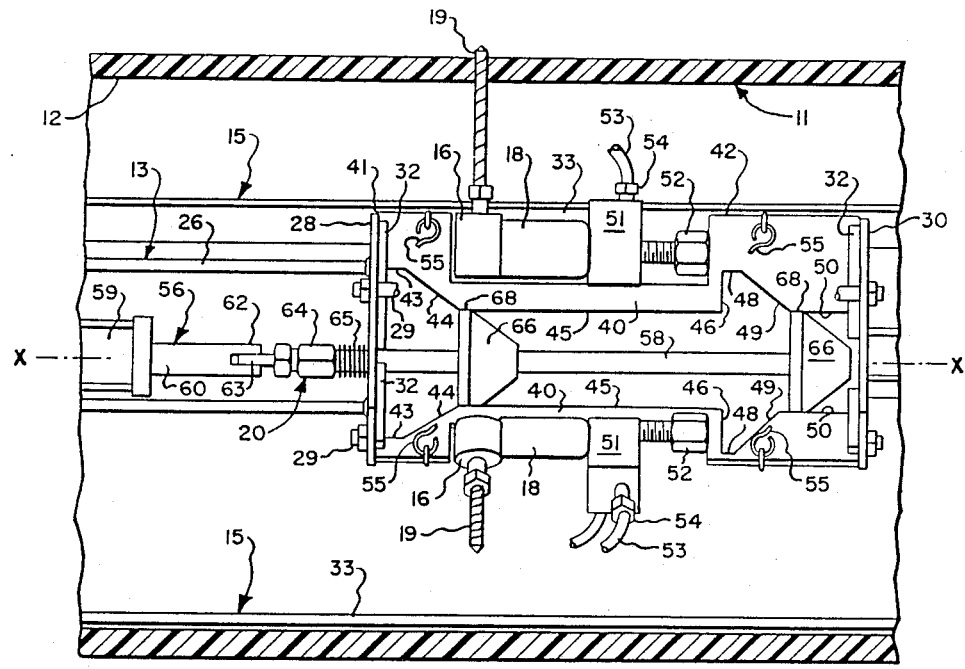
FIG. 4 is a further enlarged fragmentary longitudinal vertical sectional view of a portion of the actuator mechanism, and showing the drills as being in their radially-extended positions and as having drilled holes through the conduit.
FIG. 5 is a further enlarged fragmentary transverse vertical sectional view thereof, taken generally on line 5—5 of FIG. 3, and showing the positions of the radially-retracted drills in solid and the positions of the radially-extended drills in phantom.

Referring now principally to FIG. 4, the three chucks 16 and motors 18 are shown as being mounted on three longitudinally-extending radially-movable plate-like members, severally indicated at 40, there being one chuck and motor on each such member. The left and right marginal end portions of each plate-like member are slidably received in the radial slots defined between each pair of spaced parallel bosses 32,32. Thus, the three plate-like members, each with its associated chuck and motor, are mounted for movement in a radial direction at interval angles of about 120°.

More particularly, each plate-like member is shown as having radially-extending left and right end faces 41,42, respectively, a longitudinally-extending outwardly-facing surface 42 provided with an intermediate U-shaped recess, and an inwardly-facing longitudinal surface. This latter surface specifically includes (from left to right in FIG. 4): an inwardly-facing horizontal surface 43 extending rightwardly from left end face 41, a leftwardly- and inwardly-facing inclined surface 44, an inwardly-facing horizontal surface 45, a rightwardly-facing radial surface 46, an inwardly-facing horizontal surface 48, another inwardly- and leftwardly-facing inclined surface 49, and an inwardly-facing horizontal surface 50 continuing rightwardly therefrom to join right end face 42. Inclined surfaces 44 and 49 are arranged in substantially parallel planes. Chucks 16 and motors 18 are arranged in the several U-shaped recesses such that the axes of drills 19 are positioned in the radial direction. Each chuck and motor is secured within a recess by means of a manifold block 51, and a selectively-extensible screw-thread connection, generally indicated at 52. In other words, connection 52 may be selectively extended to tightly hold the chuck-motor-manifold assembly within the associated plate recess. Manifold block 42 receives compressed air through a flexible hose 53 and fitting 54, and contains suitable internal passageways (not shown) communicating with the motor. The three motors may be operated simultaneously, or independently of one another, as desired.

As best shown in FIG. 2, two axially-spaced return springs, severally indicated at 55, are connected to the outer marginal end portions of adjacent plate-like members. These springs are in tension, and continuously urge the three plates to move radially inwardly toward their retracted positions (FIG. 2).

Still referring principally to FIG. 2, actuator mechanism 20 broadly includes a fluid-powered actuator 56, and an actuator rod 58 operated thereby. Actuator 56 has a cylinder portion 59 and a rod portion 60. The cylinder portion has a left eye 61 received and held in the frame clevis 24 by means of a transverse retaining pin. The rod portion 60 has a clevis 62 at its right end, which receives an eye 63 mounted on the left end of rod 58. The overall length of rod 58 is variable by means of a screw-thread connection, generally indicated at 64. A coil spring 65 encircles rod 58 and is arranged to act between frame plate 28 and the rod, and continuously urges the rod to move leftwardly toward its axially-retracted position relative to the cylinder. Of course, if a double-acting actuator is used, spring 65 may be eliminated altogether. In any event, rod 58 carries two axially-spaced cam members. These cam members include frusto-conical cam surfaces 66 arranged to normally slidably engage plate surfaces 44,49, and have a short outwardly-facing horizontal cylindrical surfaces 68 arranged to engage plate inner surfaces 45,50, when the plate is in its radial outwardmost position (as shown in FIG. 4).

The various motors and actuators are preferably fluid-operated. These may be conveniently powered by compressed air supplied by a suitable source (i.e., an air compressor) on the surface. Such compressed air may be fed down to the device by means of flexible conduits and/or hoses, which have been eliminated from the accompanying drawings in the interest of clarity. In the preferred embodiment, one valve is used to control the flow on compressed air to all three motors 18. However, as indicated above, these motors could, alternatively, be controlled independently of one another. Another flexible conduit (not shown) is arranged to supply compressed air to actuator 56, to selectively move the chucks and drills radially outwardly. When such fluid in the chamber of actuator 56 is vented, return spring 65 urges rod portion 60 to retract axially within cylinder portion 59, and return springs 55 urge the three plate-like members to move radially inwardly of the frame.

Thus, the improved apparatus is adapted to be positioned within a conduit, and translated to a particular location therealong. The specific means for translation (not shown) may simply include an appropriate rope or cable (not shown) connected to left and/or right eyes 14, and used to selectively pull the improved device to such desired location. Various ancillary means and mechanisms may be used to aid in the positioning of the improved device within the conduit. For example, the position of the improved apparatus relative to the conduit may be determined by means of closed-circuit television monitors. These are normally used in the subsequent grouting operation, and, hence, may be readily available on site. Once in position, compressed air is supplied to the device to cause motors 18 to rotate. This causes the three chucks and drills to rotate about their respective axes. Thereafter, compressed air may be supplied to actuator 56 to cause the three plate-like members to move radially outwardly such that the drills will bore holes through the conduit wall. Once this has been done, the air in actuator 56 is appropriately vented, and the return springs 55 radially retract the three plate-like members, together with the drills and motors carried thereby. Thereafter, the apparatus may be moved further along the conduit, or withdrawn, as desired.

After the holes have been drilled in the sewer, the conventional grouting apparatus may be used to apply grout and/or sealant thereto. However, with such deliberately-provided holes of relatively-large diameter when compared to cracks, the grout may more freely pass through such holes and bond to the outside of the sewer, thereby providing substantially enhanced life and integrity to the seal.

Of course, persons skilled in this art will readily appreciate that various changes and modifications may be made. For example, rather than being pulled along the conduit, the apparatus could be made to be self-propelled. The various motors and actuators may be pneumatically-, hydraulically-, or electrically-operated, as desired. If a double-acting actuator is used, return spring 65 may be eliminated. Other means may be used for biasing the three plate-like members to move toward their radially-retracted positions. Moreover, the invention is not limited to use with three plate-like members, each carrying its own motor and/or drill. Any greater or lesser number may be used, and these may be powered by the same source, or may be powered by independent sources. Similarly, while it is presently preferred to use the improved apparatus to drill holes through a subterranean sewer, persons skilled in this art will readily appreciate that other types of rotatable tools could be substituted therefor and used to perform other operations as well. It should also be apparent that other types of skids or centering devices could be substituted for those shown.

Therefore, while the preferred embodiment of the improved device has been shown and described, and several modifications thereof discussed, persons skilled in this art will readily appreciate that various additional changes and modifications may be made without departing from the spirit of the invention, as defined and differentiated by the following claims.

We claim:

1. Apparatus for selectively rotating a tool relative to the wall of a conduit, comprising:
    a frame adapted to be positioned within said conduit and translated to a desired location therealong;
    a chuck rotatably mounted on said frame;
    a motor operatively arranged to selectively rotate said chuck at a desired rotational speed;
    a tool releasably held in said chuck; and
    an actuator mechanism acting between said frame and chuck and selectively operable to cause said tool to move away from said frame to engage said conduit wall, said actuator mechanism including a plate mounted on said frame for movement in a substantially radial direction relative to said conduit wall, wherein said chuck and motor are mounted on said plate, wherein said plate is provided with an inclined surface, and further comprising a member having a cam surface engaging said plate surface, and an actuator acting between said frame and cam member for selectively causing said surfaces to move relative to one another.

2. The apparatus as set forth in claim 1 wherein said frame is adapted to be pulled along said conduit to said desired location.

3. The apparatus as set forth in claim 1, and further comprising:

a plurality of guides mounted on said frame and engaging said conduit wall to maintain said frame in a substantially centered position relative to said conduit.

4. The apparatus as set forth in claim 3 wherein three of said guides are provided, and wherein each guide includes a skid biased to move outwardly from said frame.

5. The apparatus as set forth in claim 1 wherein said motor is a pneumatic motor.

6. The apparatus as set forth in claim 1 wherein said tool is a drill.

7. The apparatus as set forth in claim 1 and further comprising a return spring acting between said frame and plate for holding said surfaces in contact with one another.

* * * * *